United States Patent [19]

Nagashima

[11] Patent Number: 5,607,157
[45] Date of Patent: Mar. 4, 1997

[54] MULTI-CONNECTION DEVICE FOR USE IN GAME APPARATUS

[75] Inventor: Takeshi Nagashima, Tokyo, Japan

[73] Assignee: Sega Enterprises, Ltd., Japan

[21] Appl. No.: 351,244

[22] PCT Filed: Apr. 11, 1994

[86] PCT No.: PCT/JP94/00607

§ 371 Date: Feb. 27, 1995

§ 102(e) Date: Feb. 27, 1995

[87] PCT Pub. No.: WO94/23811

PCT Pub. Date: Oct. 27, 1994

[30] Foreign Application Priority Data

Apr. 9, 1993 [JP] Japan .................................. 5-107731
Apr. 9, 1993 [JP] Japan .................................. 5-107732
Apr. 9, 1993 [JP] Japan .................................. 5-107733

[51] Int. Cl.$^6$ ........................................ A63F 9/24
[52] U.S. Cl. ............................... 273/148 B; 463/37
[58] Field of Search ................... 273/148 B, 438; 345/162, 156; 463/36–39

[56] References Cited

U.S. PATENT DOCUMENTS

| | | | |
|---|---|---|---|
| 4,047,159 | 9/1977 | Boudry . | |
| 4,313,227 | 1/1982 | Eder . | |
| 4,588,187 | 5/1986 | Dell | 273/148 B X |
| 4,816,810 | 3/1989 | Moore | 273/148 B X |
| 5,014,238 | 5/1991 | McLeish et al. . | |
| 5,214,760 | 5/1993 | Hammond et al. | 395/250 |
| 5,245,320 | 9/1993 | Bouton | 273/148 B X |
| 5,396,225 | 3/1995 | Okada et al. | 273/148 B X |
| 5,421,590 | 6/1995 | Robbins | 273/438 |
| 5,459,487 | 10/1995 | Bouton | 273/438 X |

FOREIGN PATENT DOCUMENTS

| | | |
|---|---|---|
| 485277 | 5/1992 | European Pat. Off. . |
| 2-23592 | 2/1990 | Japan . |
| 5-33778 | 5/1993 | Japan . |
| 5-51397 | 7/1993 | Japan . |
| 6-11787 | 2/1994 | Japan . |
| 6031057 | 2/1994 | Japan ........................ 273/438 |
| 6-142338 | 5/1994 | Japan . |
| WO84/03375 | 8/1984 | WIPO . |

OTHER PUBLICATIONS

Patent Abstracts Of Japan, vol. 014, No. 456 (C–0765), Oct. 2, 1990 (JP–A–02–182282).

Patent Abstracts Of Japan, vol. 018, No. 262 (C–1201), May 19, 1994 (JP–A–06–039146).

Patent Abstracts Of Japan, vol. 014, No. 456 (C0765), Oct. 2, 1990 (JP–A–02–182281).

*Primary Examiner*—Jessica Harrison
*Assistant Examiner*—Michael O'Neill
*Attorney, Agent, or Firm*—Dickstein Shapiro Morin & Oshinsky LLP

[57] ABSTRACT

A multi-connection device for use in a game apparatus for outputting data from a plurality of input means to the body of the game apparatus is provided. The multi-connection device is connected to respective input means 20, and comprises a plurality of input connections 32a–32d for inputting data from the input means 20, an output connection for outputting the data to the game console 10, and a control unit for sequentially reading the data from the input means 20 connected to the plural input connections 32a–32d and outputting at the output connection 20 the read data to the game console 10. The multi-connection device can simultaneously connect a larger number of input means than a number of input means directly to the game console without burdening the game apparatus with more data processing, and is very effective as an adaptor for use in a game apparatus.

3 Claims, 10 Drawing Sheets

[RECEIVING SIDE]     [SUPPLYING SIDE]

GAME CONSOLE 10 — Vcc, GND, SEL, STRB, ACK, DATA — MULTI-CONNECTION DEVICE 30

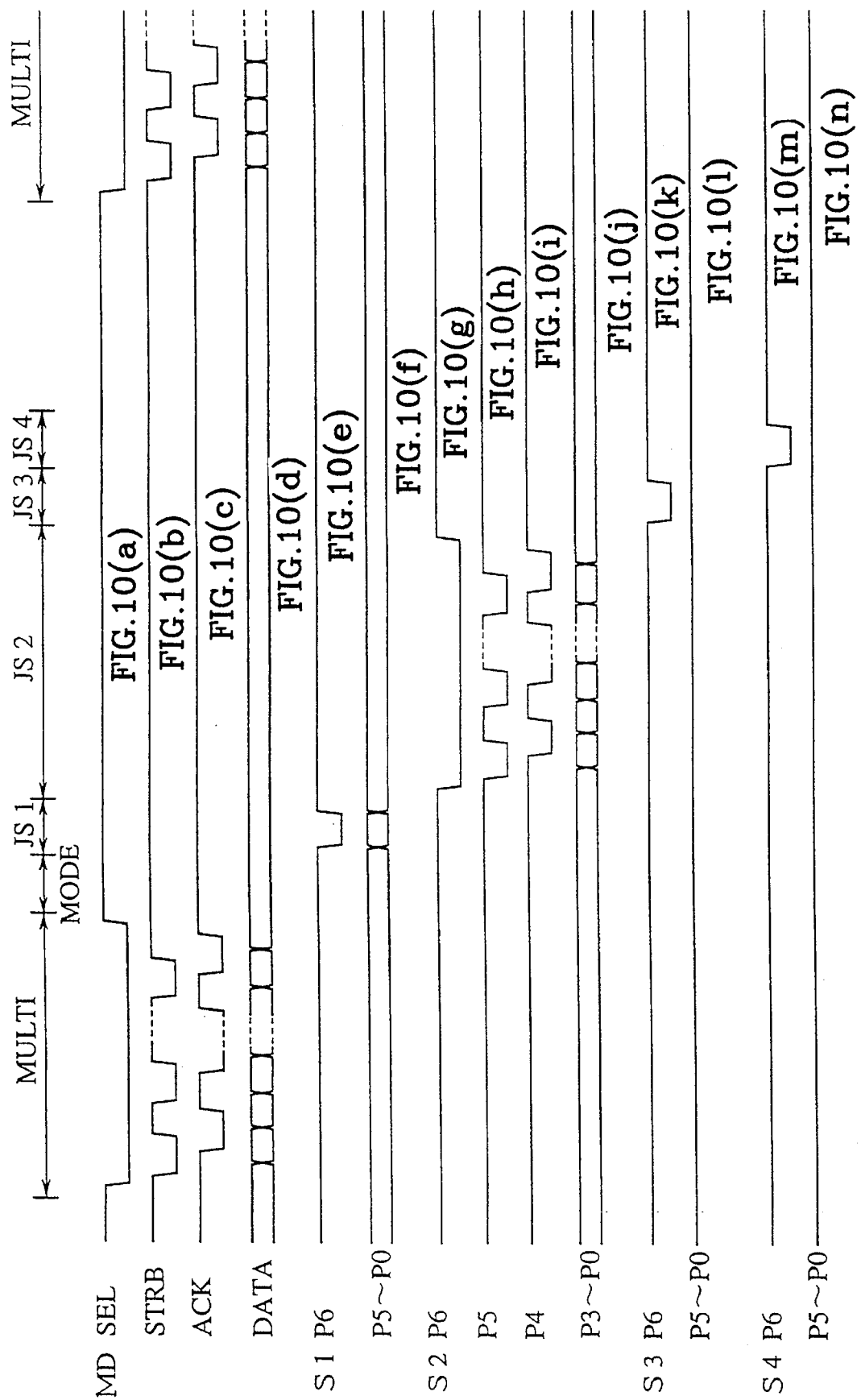

MULTI-CONNECTION DEVICE FOR USE IN GAME APPARATUS

TECHNICAL FIELD

The present invention relates to a multi-connection device for use in a game apparatus for transmitting data from a plurality of input means to a main body of the game apparatus.

BACKGROUND ART

Years have passed since home video game devices appeared, and recently a wide variety of amusing games have been developed. The video games are very popular for entertainment. Generally a home video game apparatus has 2 input means directly connected to its main body.

Consequently in the case of a software game played concurrently by three or more game players, the players operate two input means in turn in accordance with instructions of the software. But this way of using the input means is applicable only to certain types of games, such as a simulation game, etc. This has been a problem.

For software games, such as action games, shooting games, etc., which require players to operate input means in real time, adapters with a plurality of connection terminals to be connected to the input means have been developed. The input means are connected to the respective plural connection terminals, and the adaptor is connected to a connection terminal of a game apparatus body or a game console for the input means. The use of the adaptor allows players to simultaneously operate a plurality of input means to advance a game.

But in this conventional adaptor, control of the plural input means connected to the adaptor, such as monitoring of connection states of the input means, reading of data from the input means, etc., is conducted by the game console. Consequently the controlling of the input means and processing of input data by the game console are complicated, and is not applicable to games which require high-speed data processing.

An object of the present invention is to provide a multi-connection device which can supply data from a plurality of input means to a body of a game apparatus while reducing the data processing load on the game console.

DISCLOSURE OF INVENTION

A multi-connection device for use in a game apparatus according to the present invention is characterized in that the multi-connection device comprises a plurality of input connections respectively connected to input means; an output connection connected to a body of the game apparatus for outputting data to the game apparatus body; and a control unit for sequentially reading data from the input means connected to the plural input connections, and outputting the read data to the game console at the output connection.

In the multi-connection device for use in a game apparatus according to the present invention, it is preferable that the control unit includes a storing unit for storing the data of the plural input means sequentially read from the plural input means, and outputs at once at the output connection the data stored by the storing unit in a lump.

In the multi-connection device for use in a game apparatus according to the present invention, it is preferable that the multi-connection device further comprises a selection operation unit having a separate selection state which is selective of associated one of the plural input connections, and that the control unit connects, when the separate selection state is selected, the input connection selected by the selection operating unit to the output connection.

In the multi-connection device for use in a game apparatus according to the present invention, it is preferable that the selection operating unit has a multi-selective state which is selective of the plural input connections, and that the control unit outputs, when the multi-selective state is selected, at once at the output connection the data stored by the storing unit in a lump.

According to the present invention, the multi-connection device itself for use in a game apparatus sequentially reads data from a plurality of input means, and outputs at once the read data to the body of the game apparatus in a lump, whereby the game apparatus itself is less loaded, and is applicable to complicated and amusing games which require high-speed data processing.

BRIEF DESCRIPTION OF DRAWINGS

FIG. 10 is a time chart explaining the operation of the multi-connection device for use in a game apparatus according to the embodiment of the present invention.

BEST MODE FOR CARRYING OUT THE INVENTION

Figure 1:
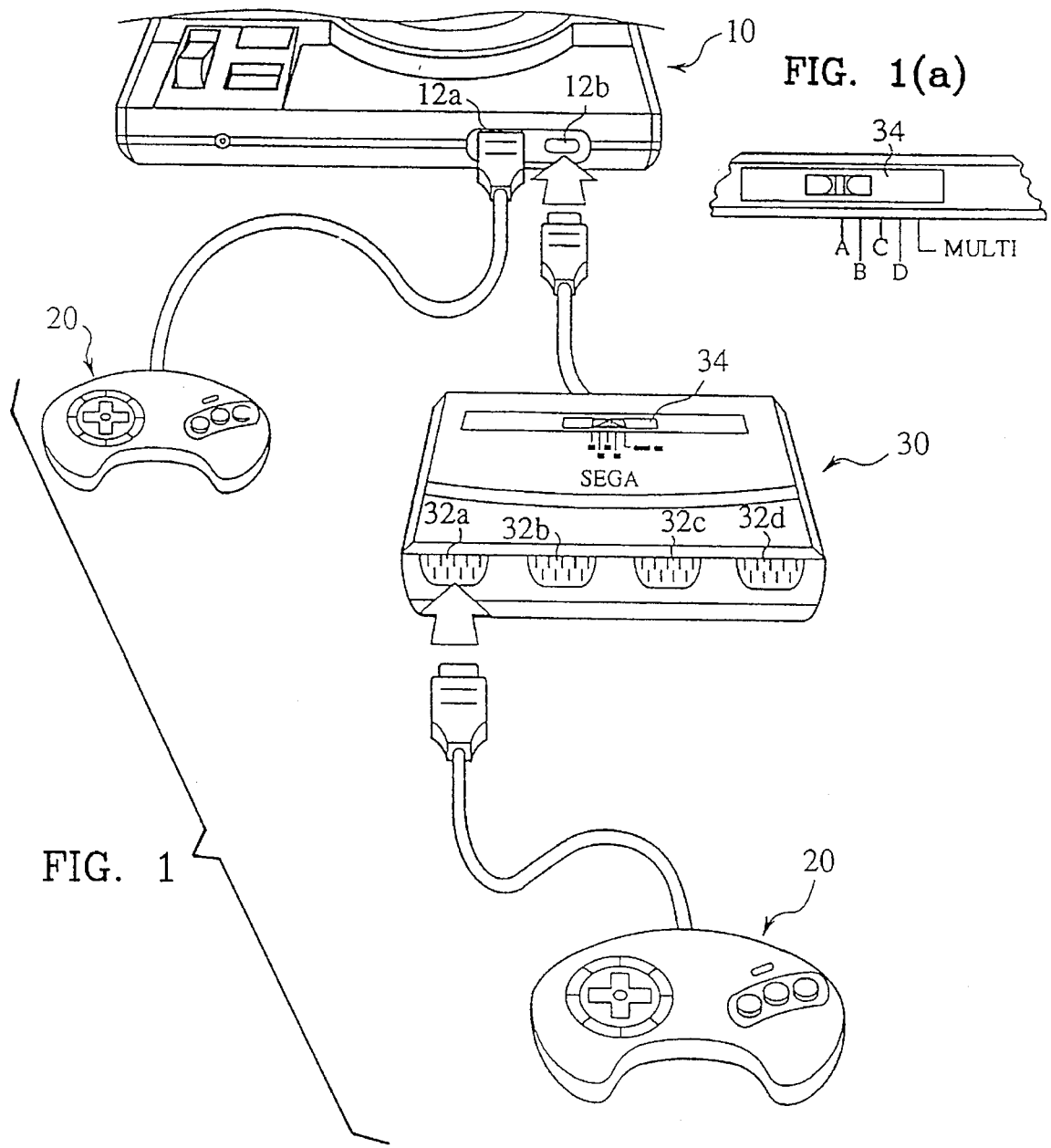
FIG. 1 is a perspective view showing the multi-connection device for use in a game apparatus according to one embodiment of the present invention.
Figure 2:
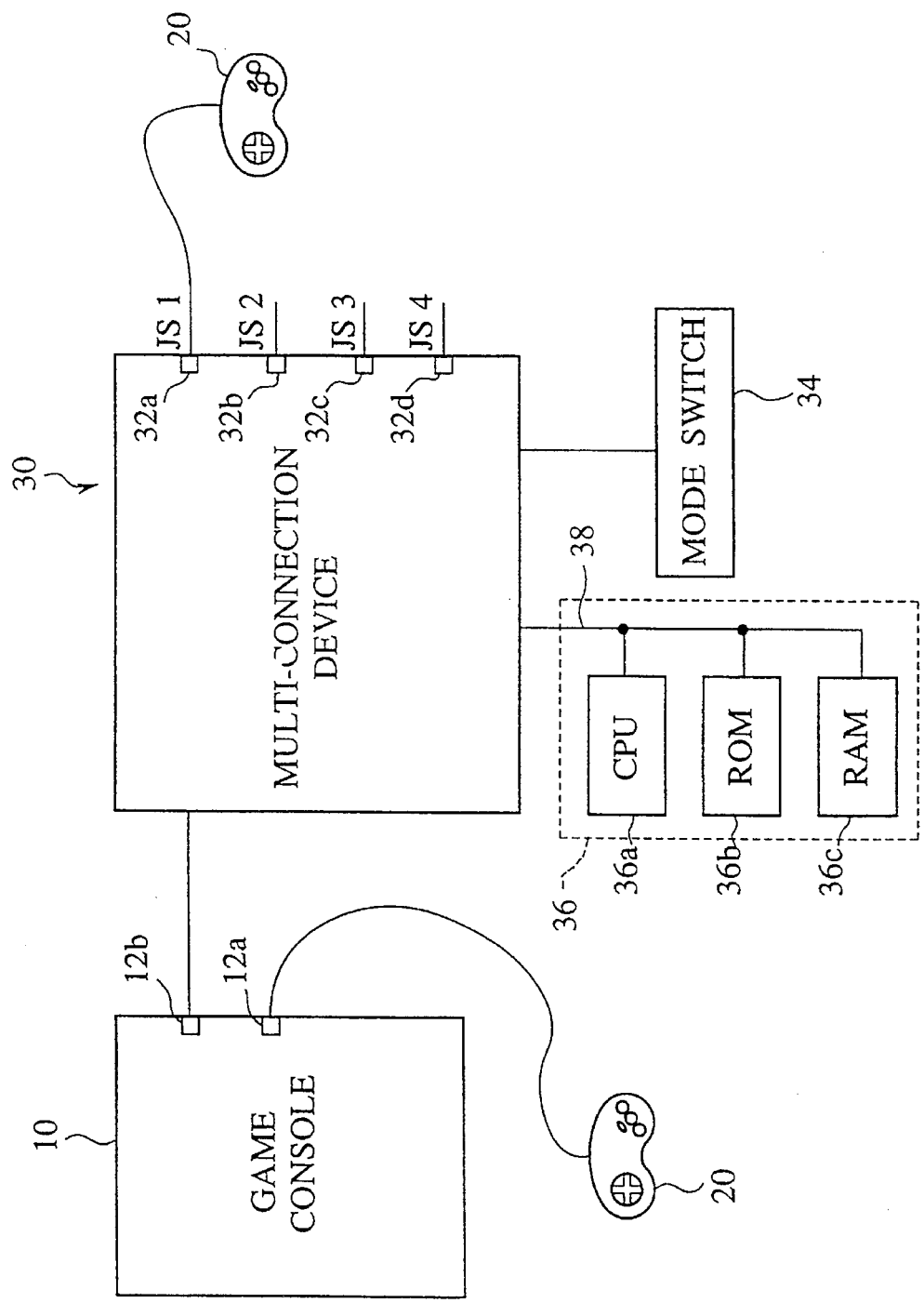
FIG. 2 is a block diagram of the multi-connection device for use in a game apparatus according to the embodiment of the present invention.

As shown in FIGS. 1 and 2, the multi-connection device 30 according to one embodiment of the present invention is provided between a game console 10 and input means 20. The game console 10 has two input connections 12a, 12b to which two, at most, input means, such as a joy pad, joy stick, mouse, etc., can be connected. The multi-connection device 30 is connected to either of the input connections 12a, 12b of the game console 10.

In FIG. 1, a joy pad, the input means 20 is connected to one 12a of the input connections of the game console 10, and the multi-connection device 30 is connected to the other input connection 12b.

The multi-connection device 30 has four input connections 32a, 32b, 32c, 32d to which four, at most, input means, such as a joy pad, joy stick, mouse, etc., can be connected. In FIG. 1, a joy pad, the input means 20 is connected to the left most input connection 32a of the multi-connection device 30.

A slide-type mode switch 34 is provided on the upper surface of the multi-connection device 30. The mode switch 34 is for selecting an operational mode of the multi-connection device 30 and is switched among a mode A for effecting only input means connected to the input connection 32a, a mode B for effecting only input means connected to the input connection 32b, a mode C for effecting only input means connected to the input connection 32c, a mode D for effecting only input means connected to the input connection 32d, and a mode MULTI for effecting all the input means connected to the four input connections 32a, 32b, 32c, 32d.

As shown in FIG. 2, a one-chip microcomputer 36 is incorporated in the multi-connection device according to this embodiment for controlling operations of the multi-connection device 30. The one-chip microcomputer 36 comprises a CPU 36a, a ROM 36b and a RAM 36c, and is connected to a bus line 38.

This embodiment uses the one-chip microcomputer 36 for controlling operations of the multi-connection device 30, but may use for the control a logic circuit which does the same operation as the one-chip microcomputer 36.

FIG. 3 shows examples of the input means 20 usable on the multi-connection device according to this embodiment.

Figure 3A:
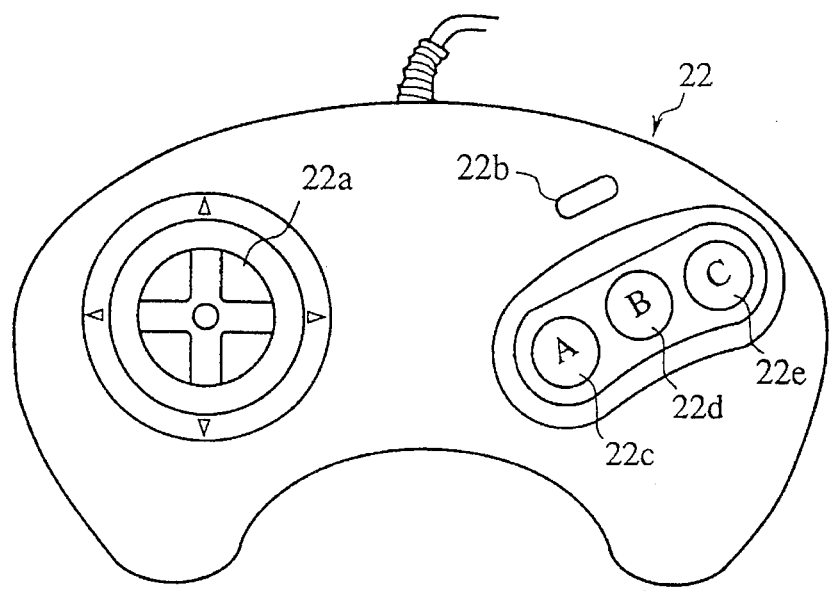
FIGS. 3A to 3C are examples of input means usable in the multi-connection device for use in a game device according to the embodiment of the present invention.

FIG. 3A shows a common three-button joy pad 22. The joy pad 22 has a direction button 22a on the left side, and a start button 22b, and three instruction buttons 22c, 22d, 22e on the right side.

Figure 3B:
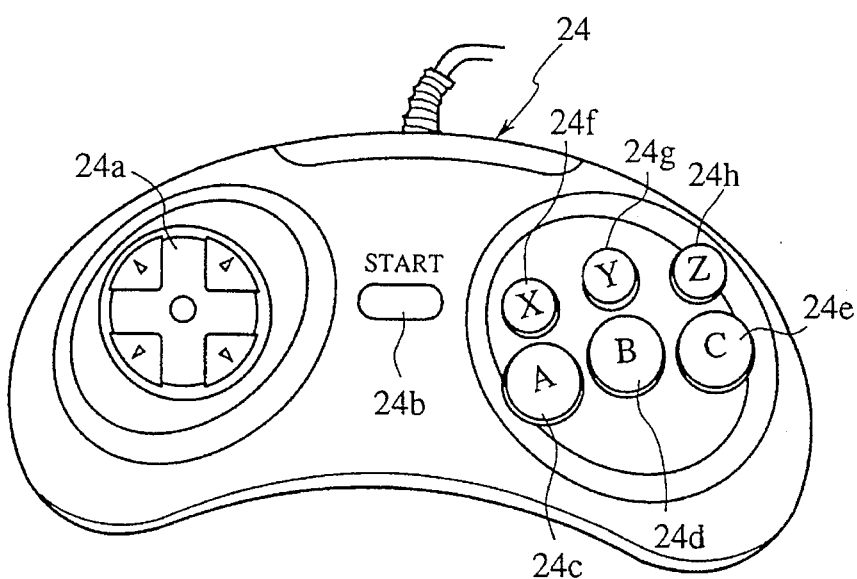

FIG. 3B shows a six-button joy pad 24 which is an improvement of the general three-button joy pad 22 in operability. A direction button 24a for instructing a direction is provided on the left side, a start button 24b is provided at the center, and six instruction buttons 24c, 24d, 24e, 24f, 24g, 24h are provided on the right side.

Figure 3C:
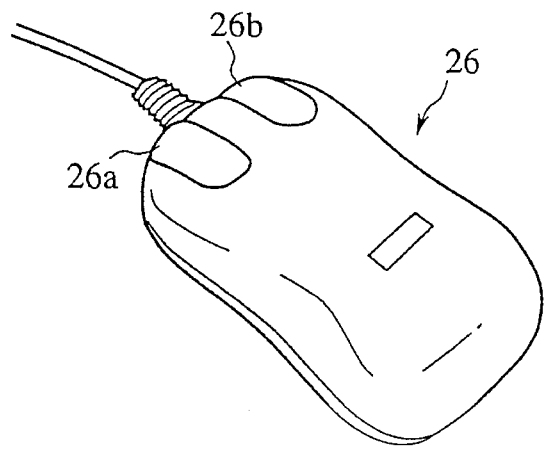

FIG. 3C shows a mouse 26. The mouse 26 has a rotary ball (not shown) on the underside and is moved over a desk, whereby the ball is rotated to input data of a moving direction and moving distance. Two switch buttons 26A, 26B are provided on an upper part thereof, and are pushed to input various instructions.

Figure 4:
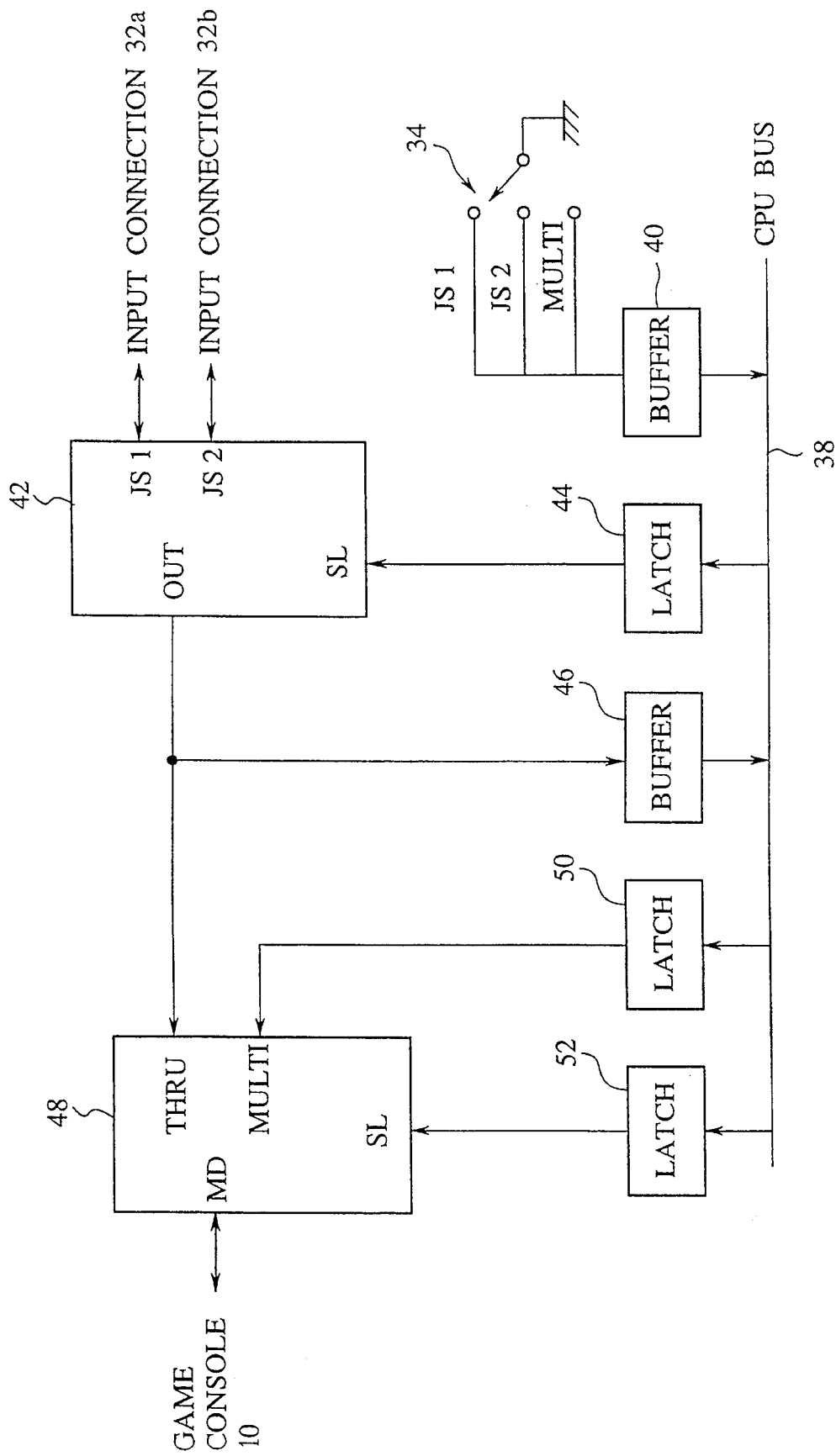
FIG. 4 is a block diagram of a major part of the multi-connection device for use in a game device according to the embodiment of the present invention.

Then the structure of the multi-connection device 30 according to this embodiment will be explained in good detail with reference to FIG. 4. For simplifying the explanation, FIG. 4 shows only two input connections 32a, 32b.

First the multi-connection device 30 will be explained with reference to the block diagram of FIG. 4.

The mode switch 34 includes a terminal JS1 for the mode A of effecting only input means connected to the input connection 32a, a terminal JS2 for the mode B for effecting only input means connected to the input connection 32b, and a terminal MULTI for the mode MULTI for effecting all the input means connected to the input connections 32a, 32b.

The mode switch 34 is connected to the bus line 38 through a buffer 40. A state of the mode switch 24 is outputted to the bus line 38 through the buffer 40.

An input selector 42 selects either of the two input connections 32a, 32b to output on input data from the selected input means 20. The input selector 42 includes the input terminals JS1, JS2 respectively connected to the input connections 32a, 32b, an output terminal OUT for outputting the selected data, and a control terminal SL for inputting a selected signal. A latch 44 is connected to the control terminal SL of the input selector 42, and the latch 44 is connected to the bus line 38.

When instruction data is supplied to the latch 44 through the bus line 38, the input selector 42 selects one of the input terminals JS1, JS2 and, based on the latched instruction data by the latch 44, connects the same to the output terminal OUT.

When the mode A is selected by the mode switch 34, instruction data for connecting the input terminal JS1 to the output terminal OUT is latched by the latch 44, and the input terminal JS1 and the output terminal OUT are placed in contact with each other.

When the mode B is selected by the mode switch 34, instruction data for connecting the input terminal JS2 to the output terminal OUT is latched by the latch 44, and the input terminal JS2 and the output terminal OUT are placed in contact with each other.

When the mode MULTI is selected by the mode switch 34, the instruction data for connecting the input terminal JS1 to the output terminal OUT, and that for connecting the input terminal JS2 to the output terminal OUT are suitably latched by the latch 44, and the input terminals JS1, JS2 are connected to the output terminal OUT dynamically alternately.

Data outputted from the output terminal OUT of the input selector 42 is supplied to the bus line 38 through the buffer 46 and to an output selector 48.

The output selector 48 selectively outputs either the data outputted from the output terminal OUT or data latched by a latch 50. The output selector 48 includes an input terminal THRU connected to the output terminal OUT of the input selector 42, an input terminal MULTI connected to the latch 50, an output terminal MD connected to the game console 10, and the control terminal SL for receiving a selection signal. A latch 52 is connected to the control terminal SL of the output selector 48 and the bus line 38.

The input selector 42, the latch 44, the buffer 46, the output selector 48, the latch 50 and the latch 52 constitute a control unit for controlling the multi-connection device 30.

When instruction data is latched by the latch 52 through the bus line 38, based on the latched instruction data by the latch 52 the output selector 48 selects either of the input terminals THRU, MULTI and connects the same to the output terminal MD.

When either of the modes A, B is selected by the mode switch 34, instruction data for connecting the input terminal THRU to the output terminal MD is latched by the latch 52, and the input terminal THRU and the output terminal MD are placed in contact with each other.

When the mode MULTI is selected by the mode switch 34, instruction data for connecting the input terminal MULTI to the output terminal OUT is latched by the latch 52, the input terminal MULTI and the output terminal MD are placed in contact with each other.

The input selector 42 can switch the input terminals JS1, JS2 dynamically by the latch 44. Input data from the input mean 20 connected to the input connections 32a, 32b are sequentially outputted to the bus line 38 through the buffer 46, and stored by the RAM 36c of the one-chip microcomputer 36. The input data stored in the RAM 36c are sequentially latched by the latch 50 and are supplied through the output selector 48 to the game console 10 from the output terminal MD.

Figure 5:
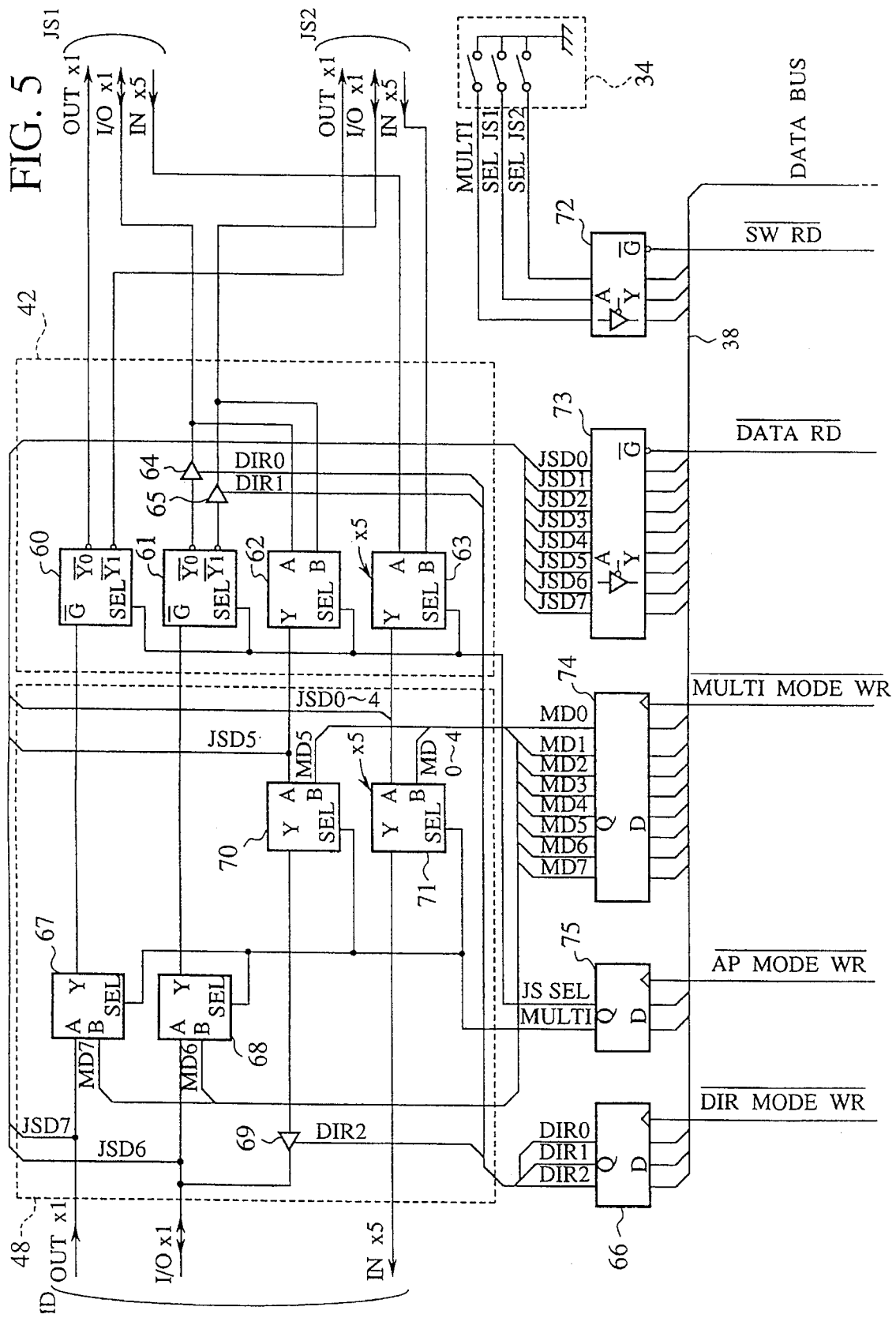
FIG. 5 is a circuit diagram of the major part of the multi-connection device for use in a game apparatus according to the embodiment of the present invention.

FIG. 5 is an example of the circuit diagram of the multi-connection device 30 of FIG. 4. The correspondence between the two will be explained.

The input terminals JS1, JS2 of the input selector 42 and the input means are connected to each other by nine signal lines. The output terminal MD of the output selector 48 and the game console 10 are connected to each other by nine signal lines.

Two of the nine signal lines are for a power source Vcc, and GND, and the rest seven signal lines are for input and output of data. One of the seven signal lines is always for output of signals. One of the rest six signal lines is for input or output of signals. The rest five signal line are for input of signals.

Here the output signal line means a signal line for outputting a signal from the input terminals JS1, JS2 of the input selector 42 to the input means 20. The input signal lines means a signal line for inputting a signal from the input means 20 to the input terminals JS1, JS2 of the input selector 42.

The input selector 42 comprises decoders 60, 61, selectors 62, 63(five), tristate buffers 64, 65, and a latch 66. The output selector 48 comprises selectors 67, 68, a tristate buffer 69, selectors 70, 71(five), and the latch 66. FIG. 4 does not show the latch 66 which is an internal component of the input selector 42 and the output selector 48.

The buffer 40 corresponds to the buffer 72; the latch 44, to the latch 75; the buffer 46, to the buffer 73; the latch 50, to the latch 74; and the latch 52, to the latch 75. The latch 75 includes the latch 44 and the latch 52.

The operation of the multi-connection device 30 according to this embodiment will be explained with reference to FIGS. 6 to 10.

Figure 6:
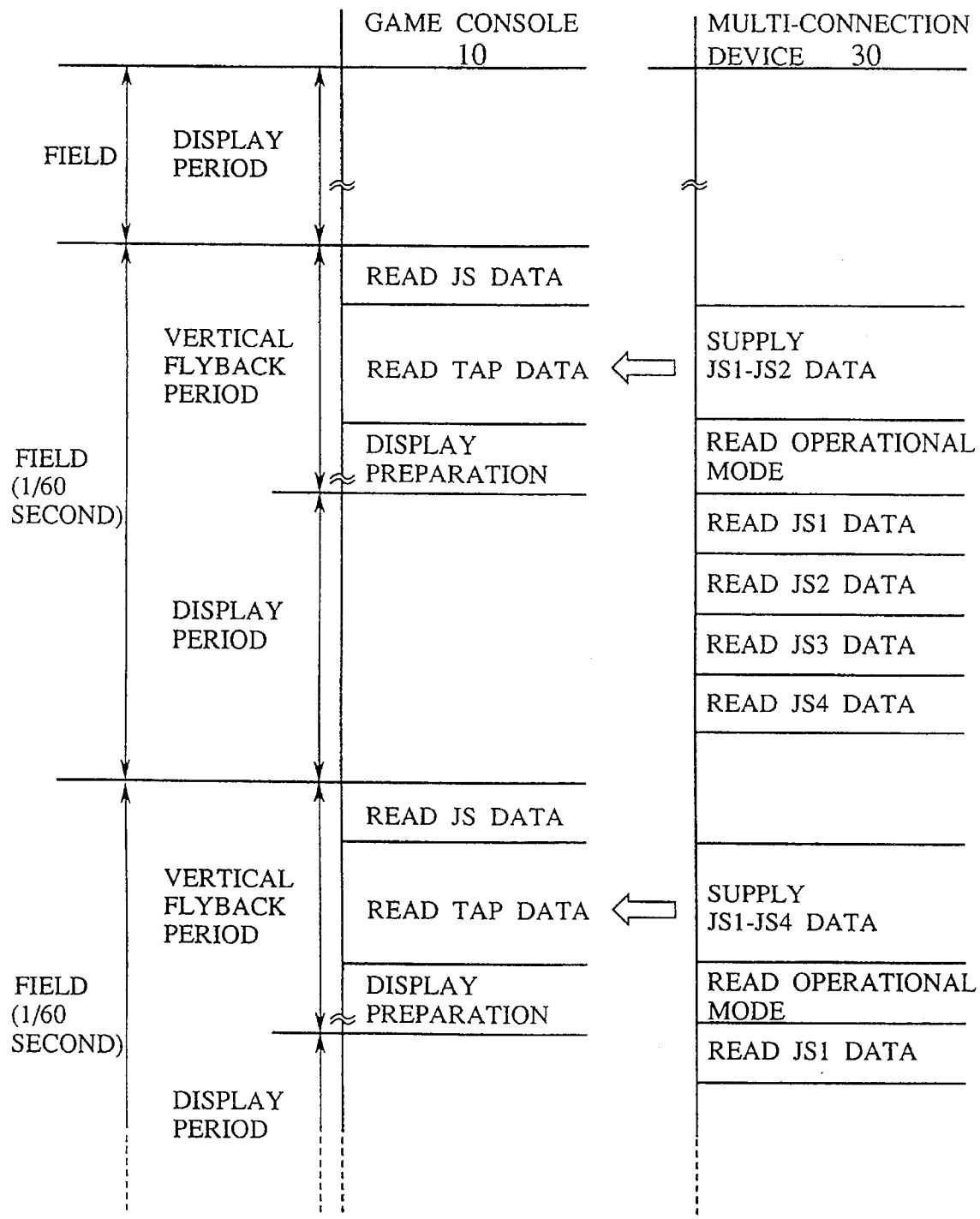
FIG. 6 is an explanatory view of the operation of the multi-connection device for use in a game apparatus according to the embodiment of the present invention.
Figure 7:
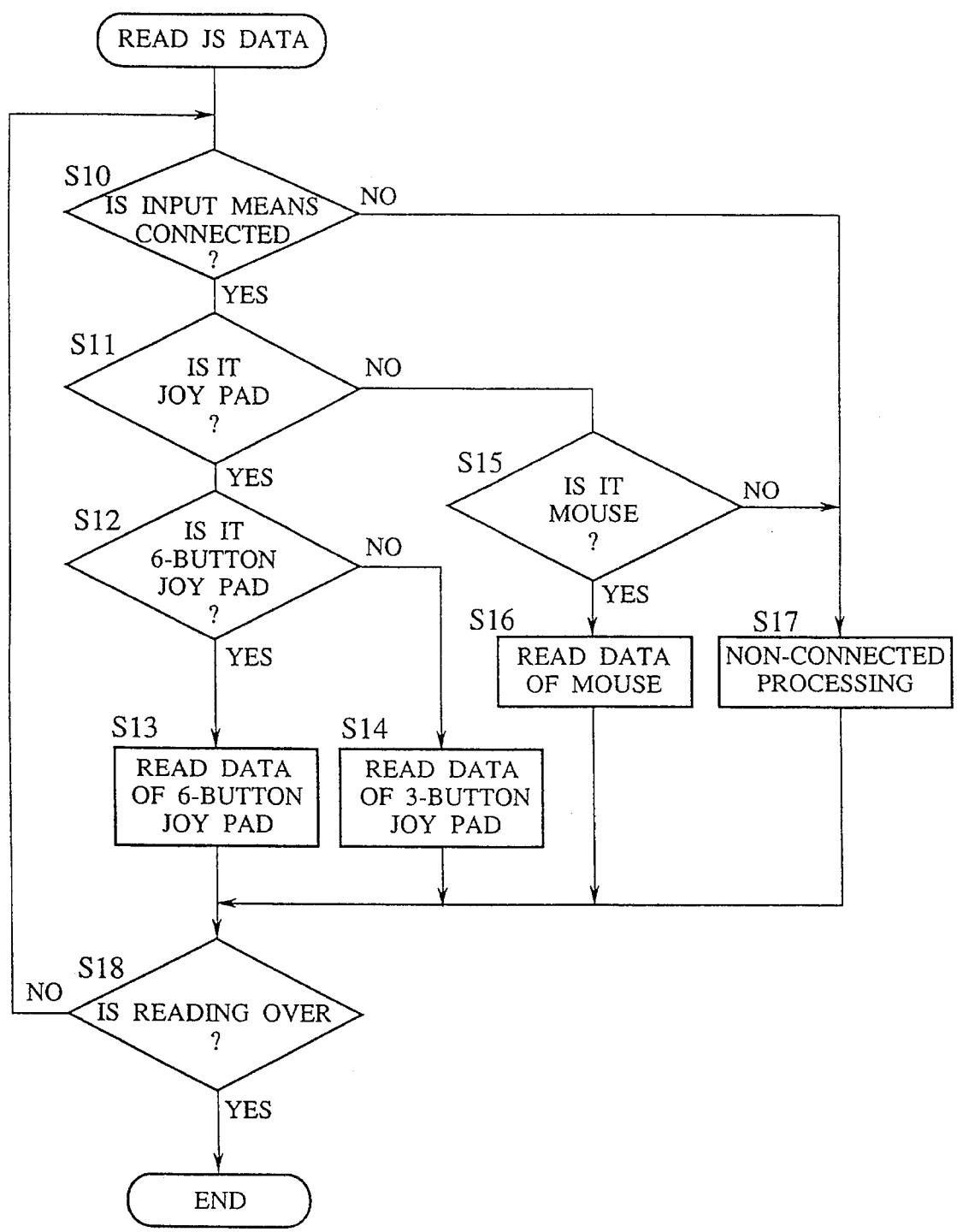
FIG. 7 is a flow chart explaining the operation of the multi-connection device for use in a game apparatus according to the embodiment of the present invention.

The operation of the multi-connection device 30 will be briefed with reference to FIG. 6.

In a video game apparatus, control is conducted every scanning period (1/60 seconds) for one field which is a screen formed by one vertical scanning of TV set. A period of one field includes a display period in which images are displayed, and a vertical flyback period in which no images are displayed. In the vertical flyback period, in which no images are displayed, data from a plurality of input means are supplied from the multi-connection device 30 to the game console 10.

When a vertical flyback period starts, the game console 10 first reads data from the input means 20 directly connected to the input connection 12*a*, and then reads input data of a plurality of input means 20 from the multi-connection device 30. Then, based on the read input data, the game console 10 conducts display preparatory processing, such as movements of players' characters, movements of opponents' characters, etc. In a display period, the game console 10 displays a image prepared in the vertical flyback period.

On the other hand, when a vertical flyback period starts, the multi-connection device 30 supplies, in response to an instruction of the game console 10, the prepared input data from the plural input means to the game console 10. Then the multi-connection device 30 reads an operational mode from the mode switch 34.

When the operational mode is one of modes A–D for effecting only individual input connections 32*a*–32*d*, the input selector 42 connects one of the input terminals JS1–JS4 for the selected modes to the output terminal OUT, and the output selector 48 connects the input terminal THRU to the output terminal MD.

When the operational mode is the multi mode MULTI for effecting all the input means, as shown in FIG. 6, input data are sequentially read from the input means 20 connected to the input connections 32*a*, 32*b*, 32*c*, 32*d* to prepare input data to be supplied to the game console 10. The thus-prepared input data are supplied to the game console 10 in a next vertical flyback period.

Then the operation of the multi-connection device 30 will be explained in good detail with reference to FIGS. 7 to 10.

In the through modes A to D, the multi-connection device 30 functions as a mere switch. That is, one of the input terminals JS1–JS4 for the selected mode is connected to the output terminal OUT, and, in the output selector 48, connects the input terminal THRU to the output terminal MD, so that the input means 20 connected to the effected input connection is directly connected to the input connection 12*b* of the game console 10. The game console 10 reads input data from the input means 20 connected to its own input connection 12*a*, and then reads input data from the input means 20 connected to the multi-connection device 30.

In the multi mode MULTI, when supply of input data to the game console 10 is over, input data to be supplied to the game console 10 is prepared, and the input data is outputted in a next vertical flyback period. The operation will be explained in accordance with this procedure.

After a switch state of the mode switch 34 is read, connection states of the input connection terminals 32*a*–32*d*, and input data from the plural input means 20 are read. The reading operation will be explained with reference to the flow chart of FIG. 7.

First, it is judged whether or not input means in any form is connected to the input connection 32*a* (step S10).

When input means in any form is connected thereto, it is judged whether the input means is a joy pad (step S11). When the input means is a joy pad, a kind of the joy pad, and the switch states of the joy pad are read by the seven signal lines of the input terminal JS1 (steps S12, 13 and 14).

The joy pad includes a three-button joy pad 22 (FIG. 3A) and a six-button joy pad 24 (FIG. 3B). Thus it is judged beforehand in step S12 whether the joy pad is a six-button joy pad.

When the joy pad is a three-button joy pad 22, it is necessary to read the states of eight switches. As in FIG. 8, an ID code [0000] for the three-button joy pad is generated, and a level of the output signal line is changed to read through the input signal line data of the three-button joy pad 22, and the date is stored (step S14).

When the joy pad 22 is a six-button joy pad 24, it is necessary to read 12 bit input data. As in FIG. 8, an ID code [0001] for the six-button joy pad is generated, and the level of the output signal line is changed to read through the input signal line data of the six-button joy pad 24, and the data is stored (step S13).

When the input means connected to the input connection 32*a* is not a joy pad, it is judged whether or not the input means is a mouse (step S15). When the input means is a mouse, two of the seven signal lines of the input terminal JS1 are used as output signal lines, and the rest five signal lines are used as input signal lines to read the kind of the input means, a position of the mouse and states of the switches (step S16). As in FIG. 8, when the input means is a mouse, an ID code [0010] for the mouse is generated, and a level of the output signal line is changed to read and store a position of the mouse and data of the switches.

When it is judged in step S10 that no input means is connected, or it is judged in step S15 that the input means is neither a joy pad nor a mouse, non-connected processing is conducted (step S17). An ID code [1111] for non-connected is generated, and data from the signal lines are not stored.

When reading from the input connection 32a is over, it is judged whether the reading from the other input connections 32b–32d is over (step S18). The processing of step S10 to S17 is repeated until the reading from the input connections 32a–32d is over.

Figure 8:
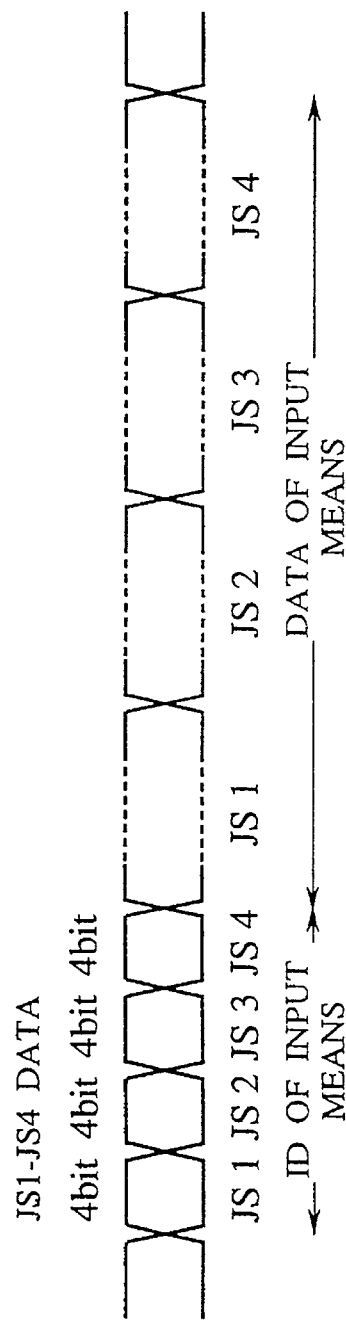
FIG. 8 is an explanatory view of the operation of the multi-connection device for use in a game apparatus according to the embodiment of the present invention.
Figure 9A:
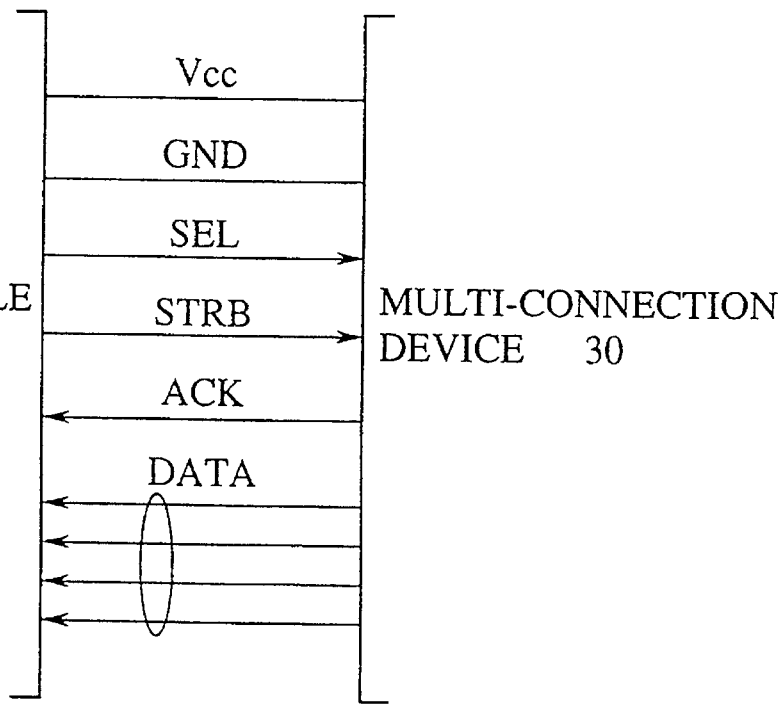
FIGS. 9A and 9B are explanatory views of the operation of the multi-connection device for use in a game apparatus according to the embodiment of the present invention.
Figure 9B:
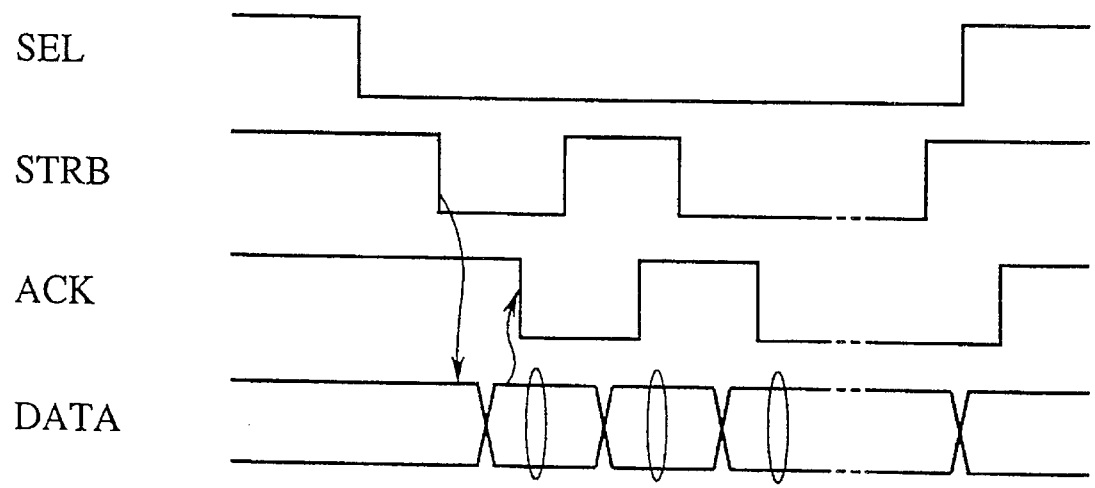

Such read data is aligned as in FIG. 8 into a set of input data. IDs indicative of kinds of the input means connected to the four input connections 32a–32d are positioned at the head of the alignment. The IDs are followed by the input data from the respective input means. This alignment enables the game console 10 to first read the IDs indicative of kinds of the input means and to know, without failure, a bit number of the total input data because bit numbers of the input data from the respective input means are determined in accordance with the IDs. Also only a necessary bit number can be supplied between the game console 10 and the multi-connection device 30.

Thus preparation of the input data to be supplied is completed.

When a vertical flyback period starts, and reading of the data from the input means 20 connected to the input connection 12a of the game console 10 is over, the input data is supplied to the game console 10 from the multi-connection device 30. This supply operation will be detailed with reference to FIGS. 9A and 9B.

The multi-connection device 30 and the game console 10 are connected to each other by nine signal lines. Two of the nine signal lines are used for a power source Vcc and GND. The rest seven signal lines are used for input and output of data. Two of the seven signal lines are used as output signal lines, and the rest five signal lines are used as input signal lines. As show in FIG. 9A, the two output signal lines are a select signal line SEL and a strobe signal line STRB. The five signal lines are an acknowledge signal line ACK and four data signal lines DATA. These signal lines are controlled to supply the input data of FIG. 8 from the multi-connection device 30 to the game console 10.

Here the output signal line means a signal line for outputting signals from the game console 10 to the multi-connection device 30. The input signal line means a signal line for inputting signals from the multi-connection device 30 to the game console 10.

The game console 10 places the select signal line SEL at a low level when the game console 10 becomes ready to receive data. Then the multi-connection device 30 is in a mode of outputting data and monitors changes of the strobe signal line STRB of the game console 10.

When the strobe signal line STRB changes from a high level to the low level, the multi-connection device 30 outputs the first data to the data signal line DATA, changing the acknowledge signal line ACK from the high level to the low level.

The game console 10 detects the change of the acknowledge signal line ACK and reads the data supplied to the data signal line DATA. When the reading of the data is over, the game console 10 changes the strobe signal line STRB from the low level to the high level.

When the strobe signal line STRB changes from the low level to the high level, the multi-connection device 30 outputs next data to the data signal line DATA, changing the acknowledge signal line ACK form the low level to the high level.

The game console 10 detects the change of the acknowledge signal line ACK and reads the data outputted to the data signal line DATA. When the reading of the data is over, the game console 10 changes the level of the strobe signal line STRB.

This series of operations is repeated to output data from the multi-connection device 30 to the game console 10. As described above, connection states of the input connections 32a–32d of the multi-connection device 30 can be known by the first 4-time reading of data. Accordingly the game console 10 can correctly administer a number of times of reading data from the multi-connection device 30, and places the select signal line SEL and the strobe signal line STRB at the high level when the reading of data is over.

FIG. 10 is a time chart of the output terminal MD of the output selector 48 of the multi-connection device 30 and the input terminals JS1–JS4 of the input selector 42 thereof. This is a time chart for the case that a three-button joy pad 22 is connected to the input connection 32a of the multi-connection device 30, a mouse 26 is connected to the input connection 32b, and no input means are connected to the input connections 32c, 32d.

When a vertical flyback period starts, the game apparatus console 10 reads data from the input means 20 connected to the input connection 12a (period JS).

Then, the input data is outputted from the multi-connection device 30 to the game console 10 (period MULTI). The signal lines SEL, STRB, ACK, DATA of the output terminal MD change as shown, and the input data prepared in the multi-connection device 30 is supplied to the game console 10.

Subsequently switch states of the mode switch 34 of the multi-connection device 30 are read (period MODE), and then connection states of the input connections 32a–32b and the input data from the input means 20 are read (periods JS1, JS2, JS3, JS4).

As the three-button joy pad 22 is connected to the input connection 32a, the signal lines P0–P6 of the input terminal JS1 change as shown. As the mouse 26 is connected to the input connection 32b, the signal lines P0–P6 of the input terminal JS2 change as shown. Since no input means are connected to the input connections 32c, 32d, changes of the signal lines P6 of the input terminals JS3, JS4 do not change the signal lines P0–P5 as shown (periods JS3, JS4).

Thus according to this embodiment, the multi-connection device itself for use in a game apparatus sequentially reads data from a plurality of input means and set the data to output the set data to the game apparatus in a lump, so that the game console can be less burdened.

The present invention is not limited to the above-described embodiment and can cover modifications and variations.

For example, in the above-described embodiment, four input means can be connected to the multi-connection device for use in a game apparatus, but the multi-connection device may have any number of input connections.

Input means to be connected to the multi-connection device may be of kinds other than those used in the above-described embodiment.

The storing format of the input data of the input means and the method for outputting the input data explained in the above-described embodiment is one example, and the input data may be stored in other formats and outputted by other methods.

INDUSTRIAL APPLICABILITY

As described above, the multi-connection device for use in a game apparatus according to the present invention is disposed between the body of the game apparatus and input means so as to simultaneously connect a larger number of input means than a number of input means to be directly connected to the game console, without burdening the game apparatus console with more data processing, and is very effective as an adaptor for use in game apparatus. The present invention is suitable especially for software games, such as action games, shooting games, etc., which require players to operate input means in real time.

What is claimed:

1. A multi-connection device connectable as a peripheral unit to a game apparatus, said multi-connection device comprising:

a plurality of input connections respectively connected to input means;

an output connection connected to a body of the game apparatus for outputting data to the game apparatus body;

a control unit for sequentially reading data from the input means connected to the plural input connections, and outputting the read data to the game apparatus body at the output connection;

the control unit including a storing unit for storing the data of the plural input means sequentially read from the plural input means, the control unit outputting at the output connection the data of the plural input means stored by the storing unit, the control unit receiving a read instruction from the game apparatus through the output connection at predetermined intervals, and supplying, in response to the read instruction from the game apparatus, the data of the plural input means stored by the storing unit to the game apparatus through the output connection.

2. A multi-connection device according to claim 1, further comprising:

a selection operation unit having a separate selection state which is selective of associated ones of the plural input connections;

the control unit connecting, when the separate selection state is selected, the input connection selected by the selection operating unit to the output connection.

3. A multi-connection device for use in a game device according to claim 2, wherein the selection operating unit has a multi-selective state which is selective of the plural input connections;

the control unit outputs, when the multi-selective state is selected, at once at the output connection the data of the plural input means stored by the storing unit.

* * * * *